United States Patent [19]

Walker

[11] 3,886,319

[45] May 27, 1975

[54] EXCHANGE SWITCHING SYSTEM

[75] Inventor: Stephen S. Walker, Walderslade, England

[73] Assignee: GTE International Incorporated, Stamford, Conn.

[22] Filed: Sept. 28, 1973

[21] Appl. No.: 401,758

[30] Foreign Application Priority Data

Oct. 16, 1972 United Kingdom .............. 47662/72

[52] U.S. Cl. .............................................. 179/18 FA

[51] Int. Cl. .............................................. H04m 3/18

[58] Field of Search ............ 179/18 FA, 18 F, 18 H, 179/84 R, 84 A

[56] References Cited

UNITED STATES PATENTS 3,025,356 3/1962 Muroga et al. ................ 179/18 FA

*Primary Examiner*—Thomas A. Robinson
*Attorney, Agent, or Firm*—Robert J. Black

[57] ABSTRACT

A telephone line circuit including means for monitoring the off-hook/on-hook condition of an associated subscriber's telephone instrument. Included are means for applying a priming potential to the line circuit gate in response to an off-hook condition.

4 Claims, 1 Drawing Figure

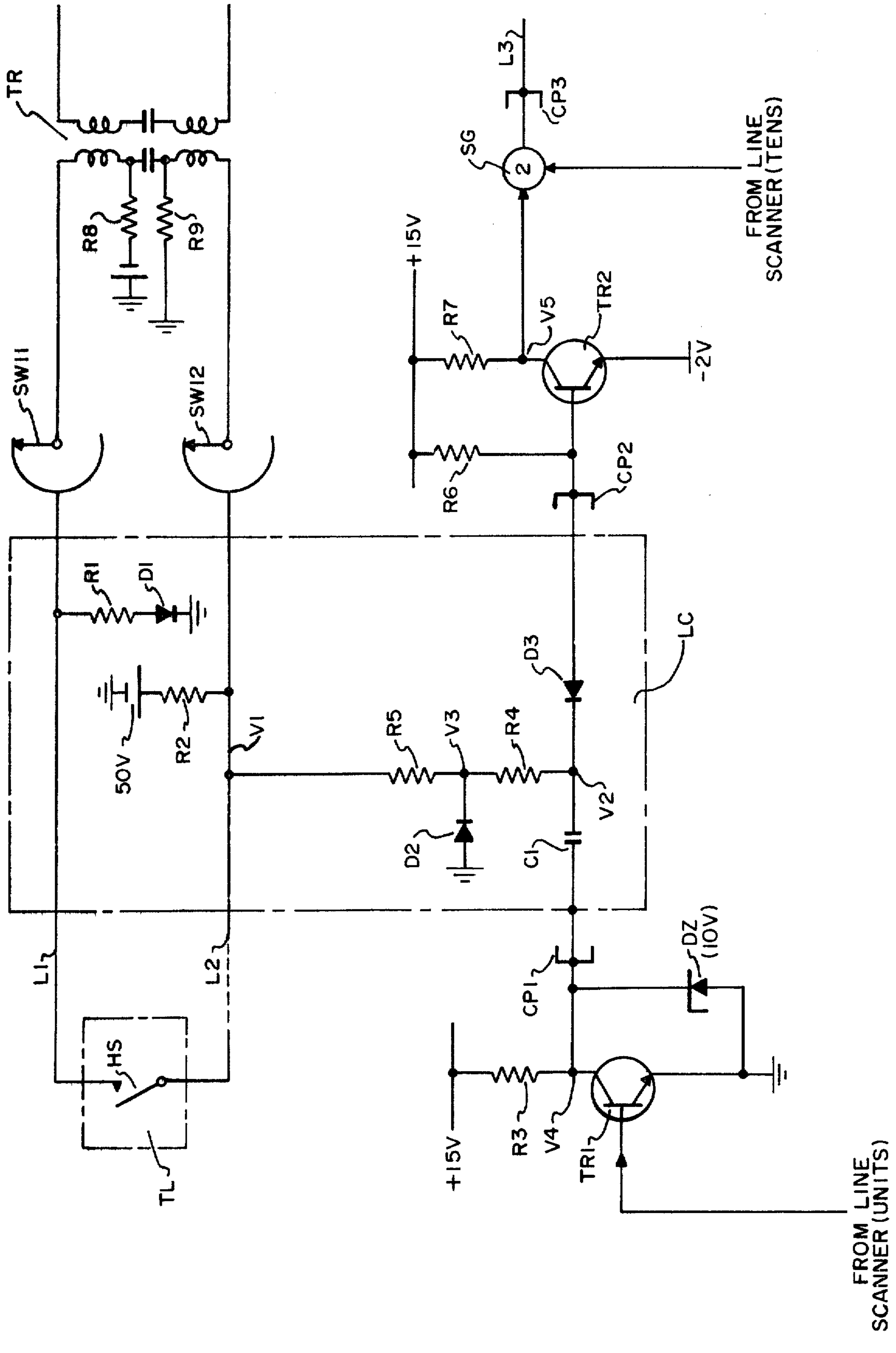
TR
R8
R9
SW11
SW12
R1
D1
50V
R2
V1
R5
V3
R4
D3
LC
D2
C1
V2
L1
L2
HS
TL
+15V
R7
V5
TR2
-2V
R6
CP2
SG
2
L3
CP3
FROM LINE
SCANNER (TENS)
CP1
DZ
(10V)
R3
V4
TR1
FROM LINE
SCANNER (UNITS)

EXCHANGE SWITCHING SYSTEM

The present invention relates to exchange, especially telephone, switching systems and particularly to line circuits for such systems.

Subscriber stations served by a telephone exchange are usually connected to the exchange over line wire pairs individual to each subscriber and telephone exchange switching systems have been proposed in which the exchange switching apparatus is arranged to effect connection to and between these line wire pairs, the system being such that the need to provide for the switching of additional control wires within the exchange, for example the usual "private" or "P" wire, is obviated.

With such two wire exchange switching systems, each subscriber line wire pair connected to the exchange has to be continuously interrogated in order that the ON-HOOK/OFF-HOOK condition of the associated subscriber stations can be constantly ascertained and notified to control apparatus located within the exchange, so that the control apparatus may make a logical determination of the service condition of each of the subscriber stations i.e. station at rest, calling for service, in use on a call, clearing, or parked, the latter condition being one in which line condition has been determined as calling, but from which no dialled information has been received and which the control apparatus has accordingly further determined that a so called P.G. condition exists on the line and has applied a "line parked" marking to the exchange selecting switches which are thereby prevented from responding to the OFF-HOOK condition of this line. Such an arrangement is described in our co-pending U.S. Pat. application Ser. No. 317,312 filed on Dec. 21, 1972 and issued Sept. 24, 1974 as U.S. Pat. No. 3,838,226.

For the interrogation of subscriber line wire pairs, the line wires of each pair are normally connected to the exchange switches over a line circuit which is operable for indicating the ON-HOOK/OFF-HOOK line conditions to the exchange control apparatus. A well known form of such a line circuit comprises line resistances and a line coincidence gate, the latter having one input connected to a line scanner means and another input connected to one line of the associated line wire pair, the output from the line gate being connected to exchange control equipment. The line resistors are connected between the respective line wires and a source of supply, the connection being effected over a cut-off means such as rectifiers or the contacts of a cut-off relay, the arrangement being such that in the ON-HOOK condition of the line wires the potential applied to the line gate is such as to inhibit the operation of this gate while in the OFF-HOOK condition of the line wires, the applied potential is a priming potential so that this gate produces an output pulse each time it is scanned from the line scanning means. In a usual form of the line circuit the line gating function is provided by a simple pulse plus bias gate comprising a capacitor, to which the one input from the line scanner is connected, a bias resistor, to which the other input from the line wires is connected and a gating rectifier to which the output lead from the gate is connected. Detection of the line gate output pulse by the exchange control equipment results in the setting of exchange switch means to connect the associated line wire pair to a call supervisory apparatus within the exchange, as a consequence of which the cutoff means in the line circuit is operated, for example by the application of a D.C. supply to the line wires, which is of opposite polarity to that initially applied over the line resistors, and which reverse biasses cut-off rectifiers in series with these resistors, or by application of a relay operating potential to a control wire extended from the line circuit to the supervisory apparatus within the exchange, where a relay cutoff means is provided. Thus the operation of the line gate is terminated and the supervision of the line condition is transferred to the exchange supervisory apparatus.

When a line circuit of the kind described above is used with a two wire exchange switching system, it is necessary to arrange for the line gate to remain connected to the associated line wires subsequent to the setting of the exchange switching means in order that the condition of the line wires can be continuously interrogated. However, where the line gate is a pulseplus-bias gate, a difficulty arises in that the recurrent operation of this gate by the line scanner means while the line is in the OFF-HOOK condition results in current fluctuations in the line wires, giving rise to an audible scanner noise or tone in the receiver of the station instrument.

The object of the present invention is to provide a modified form of the line circuit described above, in which scanner noise currents, generated by the recurrent operation of the line pulse-plus-bias gate, are diverted from the line wires while these are connected to supervisory apparatus within the exchange.

The present invention provides a two wire telephone exchange switching system including, for monitoring the ON-HOOK of OFF-HOOK (line-looped) condition of an associated subscriber's telephone instrument, a line circuit of the kind employing a scanner driven pulse-plus-bias gate for continuous interrogation of the line condition and including means responsive to the line-looped condition for applying a priming potential to the bias input of said gate, and further including means associated with the supervisory apparatus of the exchange for applying to said line circuit, via line switches when connected to the line wires, a further potential which also serves as a priming potential for the bias input of said gate, there being provided between said line circuit and the bias input of said gate a potential controlled filter means connected to a point of datum potential, and the arrangement being such that in response to application of said further potential from the exchange said filter means is rendered operative to divert scanner noise currents from the line wires.

According to one embodiment of the invention the said filter means comprises a noise quenching diode connected from a tapping between a line wire and the bias input of said gate to said point of datum potential, the arrangement being such that in the ON-HOOK condition the diode is reverse-biased whereas on application of said potential from the exchange the diode is forward biased to provide a low impedance path to the scanner noise currents.

Advantageously the said tapping is a tapping of a potential divider connected between a line wire and the bias input of said gate. Thus the diode provides a low impedance path both to scanner noise currents and also a.c. currents on the line wires, for exampie ringing currents, and avoids any interference from the latter affecting the operation of the pulse-plus-biasgate.

According to a preferred embodiment of the invention the said means for applying a priming potential from the line circuit to the bias input of said gate in response to the line-looped condition is arranged, when the line wires are unconnected to the line switches of the exchange, to apply such a potential which maintains the said noise quenching diode in the reverse-biased condition. Thus if the line circuit should be in a "parked" or P.G. condition (in which the line wires have been released from the exchange switches following termination of a call or when the line has been "timed out" following failure of the subscriber to dial digits for a new call within the required period) the scanner noise currents are allowed to be conducted to the line wires and produce an audible noise in the subscribers' telephone instrument. This noise will thus serve as a warning to the subscriber that the line is in a P.G. condition. Since upon initial occurrence of the line-looped condition the exchange switches are connected to the lines at the first scanning operation of the line circuit, this noise will not occur in other than the P.G. condition.

The invention is illustrated by way of example in the accompanying drawing, the single FIGURE of which is a circuit diagram of a line circuit according to the present invention, together with the associated scanner pulse driving and pulse detector amplifiers which have been included to enable the invention to be clearly understood.

Referring to the drawing, a line circuit according to this invention is illustrated within the dotted rectangle LC. The line circuit is shown connected to the line wires L1 and L2 extended from a subscriber's telephone instrument, T.L., which includes the usual hook-switch contacts, indicated diagrammatically by the contacts HS. These contacts occupy the open position shown, when the instrument is not in use, that is when the instrument hand-set is at rest upon the instrument cradle, and are closed to apply a loop to the line wires, when the hand-set is removed from the station instrument. The line wires L1 and L2 extend through the line circuit LC and are terminated upon a line switch, indicated by the switch banks and wipers SW11 and SW12, which when set extends the line wires, directly or via further switching stages, not shown, to a supervisory apparatus of which only the line coupling transformer TR, and the line feeding bridge resistors R8 and R9, are shown, the latter being connected respectively to the negative pole and to the earth connected positive pole, of the 50V exchange battery.

The line circuit LC comprises line resistors R1 and R2, and a pulse plus bias gate consisting of the capacitor C1, gating diode D3 and the bias resistor chain formed by the series connected resistors R4 and R5. The line resistor R1 is connected at one end to the line wire L1 and at its other end is connected to earth over the diode D1, the latter being poled to prevent current flow through it, from earth. The line resistor R2 is connected at one end to the line wire L2 and at its other end, to the positive pole of 50V battery. The bias resistor chain is connected between the line wire L2 and the junction of the series connected capacitor C1 and gating diode D3, and the mid point of the bias resistor chain is connected to earth over the noise quenching rectifier D2. The pulse plus bias gate is driven from the units counting element of the line scanner, not shown, by a pulse driver constituted by the transistor TR1. This transistor has its collector emitter path shunted by a 10V Zener diode DZ, which serves to regulate the pulse amplitude of the pulses applied to the pulse plus bias gate when the transistor TR1 is switched ON and also, to provide a low AC impedance to earth when TR1 is switched OFF. This in turn limits the effects of pick-up on the line, in the ON-HOOK condition, from operating the pulse plus bias gate. The collector electrode of transistor TR1 is connected to the +15V supply over a load resistor R3 and also, over common point CP1 to the capacitor input to the pulse plus bias gate while its emitter electrode is connected to earth. The output from the pulse plus bias gate is applied to the base electrode of a pulse detector transistor TR2 the connection being made over the commoning point CP2. The collector of transistor TR2 is connected to the +15V supply over a load resistor R7 while its emitter is connected to a point of −2V potential. The transistor is biassed into a normally conducting condition by the bias resistor R6. In a typical line circuit LC the resistor R1 is nominally 300Ω, R2 is nominally 82KΩ while resistors R4 and R5 are both nominally 470KΩ. The line circuits LC are normally arranged in row and column formation, each column of line circuits being driven from a separate pulse driver such as TR1, while the line circuits in each row have their diode outputs commoned to a separate pulse detector transistor TR2. A gate SG is associated with each detector transistor TR2, the output from the associated transistor forming one input to the gate while a second input is provided from the Tens counting element, not shown, of the line scanner. The output from the gate SG is a pulse whose time of occurrence is related to a particular counting position of the line scanner and hence also to the associated line circuit LC.

With the resistance values quoted above, and neglecting for the moment the effects of line resistance and line leakage, the operation of the line circuit LC shown in the drawing, is as follows.

When the associated telephone instrument TL is in the ON-HOOK condition, that is with the switch hook contacts HS in the open position shown, there is no current flow over the line wires, consequently line wire L1 is at earth potential while the line wire L2, and the points V1, V2 and V3 are all at the same +50V potential. The diodes D2 and D3 are thus both reverse biassed. In this condition, when the driver transistor TR1 is switched ON from the line scanner, the potential at point V4 changes from +10V to near earth potential, instantaneously reducing the potential at point V2 by approximately 10V from +50V to +40 volts. As previously mentioned the pulse detector transistor is maintained ON by the bias resistor R6 and will remain ON with the potential at point V5 held at approximately +2V until the base input is driven more negative than the emitter (+2V). Thus, in this ON-HOOK condition, the pulse plus bias gate is closed and the output from the detector transistor TR2 remains unchanged as the gate is pulsed.

When the telephone instrument TL is in the OFF-HOOK condition, that is with the switch hook contacts HS in the closed position, current flows over the line wires from the +50 volt supply, resistor R2, the contacts HS (closed), resistor R1, diode D1 to earth. The diode D1 is forwardly biassed and functions as an asymmetric resistor, so that the potential at point V1 is driven to approximately +2V. This positive potential discharges the pulse plus bias gate capacitor C1 via resistors R4 and R5, and holds diode D2 reverse biassed. Thus, after a brief time period, the potential at point V2 is also approximately +2V. Now, when the pulse drive transistor TR1 is switched ON, the potential at point V2, instantaneously changes to, (+2V − 10V) = − 8V, therefore switching the pulse detector transistor TR2, OFF. Thus, the potential at point V5 is switched from approximately −2V to + 15V, representing a significant output from the pulse detector transistor TR2. This output is passed via the associated gate SG to the output lead L3 via the common point CP3. At the end of the scanner pulse, the drive transistor TR1 is again switched OFF, and the point V2 returns to +2V potential, allowing the pulse detector transistor to again switch ON, thereby inhibiting the associated SG gate and terminating the output signal pulse of the output lead L3, in response to which the exchange control apparatus, not shown, will cause the switch indicated at SW11 and SW12 in FIG. 1 to be set to the calling line, for example in the manner described in our above mentioned co-pending Pat. application, thereby connecting the line wires through to a line supervisory transmission bridge, or equivalent circuit, so that the line wires L1 and L2 now become connected to a source of −50V and earth, respectively via the current limiting resistors R8 and R9. Under these supervisory conditions, the potential at the point V1 falls to about −25V. Thus, the diode D1 becomes reverse biassed, thereby effectively disconnecting resistor R1 from the line wire L1, while the diode D2 becomes forwardly biassed, thereby presenting a low impedance to earth and clamping the potential at point V3 to near earth potential (about −1 volt). However, the diode D3 continues to be reverse biassed, since its cathode is connected to a point of about −2 volts. When the driver transistor TR1 is again switched "ON" from the line scanner, the potential at the point V2 instantaneously changes to (−1V − 10V) = − 11V thereby causing the detector transistor TR2 to be switched OFF, thus producing an output signal on the output lead L3, as previously described. The line circuit thus produces output pulses, in response to the line interrogating pulses from the line scanner, as long as the associated telephone instrument is in the OFF-HOOK condition and the line wires L1 and L2 are looped by closure of the hook switch contacts HS.

With the arrangements described above it will be noted that while the line wires are switched through, by the setting of switch SW11 and SW12 to a supervisory or like circuit within the exchange, the steady forward bias applied to the noise quenching diode provides a low impedance path for the scanner noise currents, thereby diverting these from the line wires. Also, in this forwardly biassed condition, the noise quenching diode effectively isolates the pulse-plus-bias gate from the line wires so that AC currents such as ringing currents on the line wires have no effect on the functioning of the pulse plus bias gate.

However, should a subscriber fail to restore his handset upon the termination of a call, then the exchange control apparatus would detect the existence of a P.G. condition and the line switches SW11 and SW12 would be restored, disconnecting the supervisory apparatus from the line wires, in which condition a steady reverse bias is applied to the noise quenching diode as described above for the initial OFF-HOOK condition. Thus, in this condition, scanner noise currents are permitted to flow over the line wires, the audible noise thus produced in the receiver of the associated telephone instrument serving to indicate that the telephone line wires have been marked "parked" in the telephone exchange and that the handset of the instrument, if OFF-HOOK, should be restored.

Although the operation of the line circuit LC has been described above with reference to a perfect line, that is where the line wires themselves are considered to have zero resistance or leakance, it will be appreciated that the voltage changes across the capacitor C1 under the various line conditions of ON-HOOK, OFF-HOOK and OFF-HOOK supervised, are such that a wide range of line wire electrical parameters can be tolerated without resulting in any incorrect operation of the line circuit. For example, taking a case where each line wire has a resistance of 500Ω (that is a 1000Ω loop) and where there is a leakage resistance between the line wires and from each line wire to earth, of 100KΩ each, then it can be shown that in the ON-HOOK line condition described above, the steady potential applied to the point V2 is approximately +19V, so that each time the drive transistor is switched ON, the resulting −10V pulse from the capacitor C1 reduces the voltage at point V2 to approximately +9V, which is still well above the voltage (approximately − 3V) to which the detector transistor TR2 can respond. Similarly, in the OFF-HOOK condition of the associated line wires, it can be shown that the potential at the point V2 is approximately + 4.5 volts, so that, in this case the −10V pulse resulting from the switching of the drive transistor reduces this to approximately − 5.5 volts which is still adequate to ensure reliable response of the detector transistor TR2. In the OFF-HOOK condition when the line wires are switched through to a supervisory circuit, the line potential conditions which appertain to the line circuit are substantially the same as those described above for a perfect line, since the feeding bridge itself is a relatively low impedance device.

What we claim is:

1. A two wire telephone exchange switching system including, for monitoring on ON-HOOK or OFF-HOOK (linelooped) condition of an associated subscriber's telephone instrument, a line circuit of the kind employing a scanner driven pulseplus-bias gate for continuous interrogation of the line condition and including means responsive to the line-looped condition for applying a priming potential to the bias input of said gate, and further including means associated with the supervisory apparatus of the exchange for applying to said line circuit, via line switches when connected to the line wires, a further potential which also serves as a priming potential for the bias input of said gate, there being provided between said line circuit and the bias input of said gate a potential controlled filter means comprising a noise quenching diode connected from a tapping between a line wire and the bias input of said gate to a point of datum potential, in the ON-HOOK condition said diode being reverse-biased and the arrangement being such that in response to application of said further potential from the exchange said diode is forward biased to provide a low impedance path to the scanner noise currents and to divert scanner noise currents from the line wires.

2. A system as claimed in claim 1, in which the said tapping is a tapping of a potential divider connected between a line wire and the bias input of said gate.

3. A system as claimed in claim 1 in which said means for applying a priming potential from the line circuit to the bias input of said gate in response to the line-looped condition is arranged, when the line wires are unconnected to the line switches of the exchange, to apply such a potential which maintains the said noise quenching diode in the reverse-biased condition.

4. A system as claimed in claim 2 in which said means for applying a priming potential from the line circuit to the bias input of said gate in response to the line-looped condition is arranged, when the line wires are unconnected to the line switches of the exchange, to apply such a potential which maintains the said noise quenching diode in the reverse-biased condition.

* * * * *